Aug. 8, 1967

J. DE VRIES ET AL 3,334,792

ADHESIVE APPLICATOR

Filed May 19, 1966

INVENTORS
JOSEPH E. DE VRIES
BY GEORGE Z. PIENCINSKI

ATTORNEYS

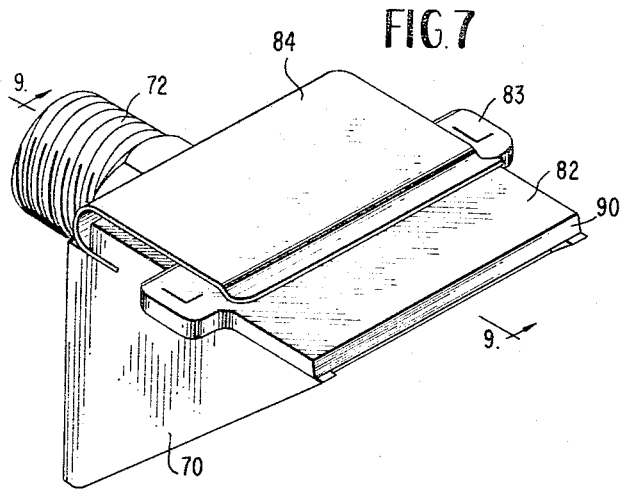
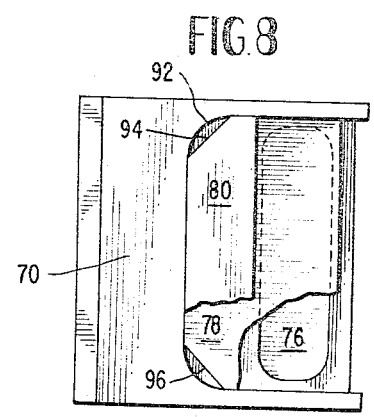
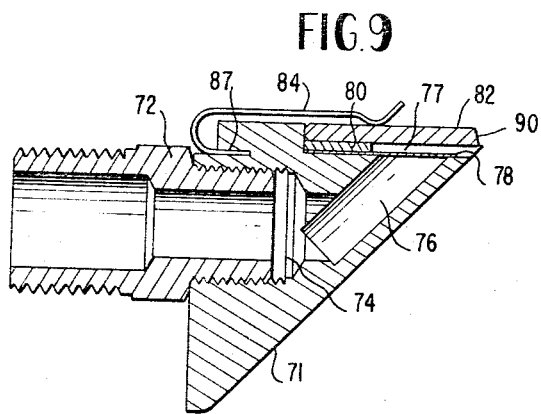
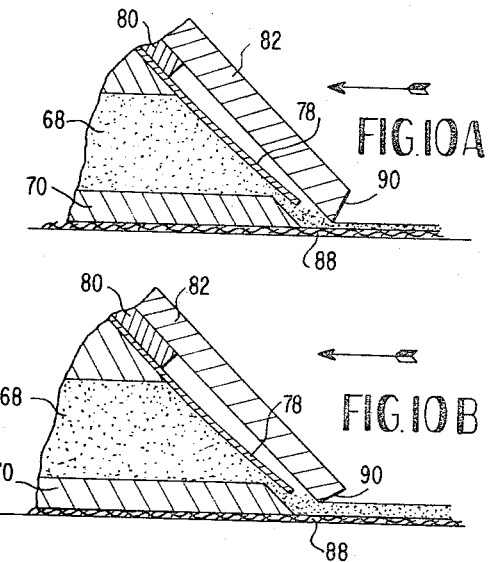
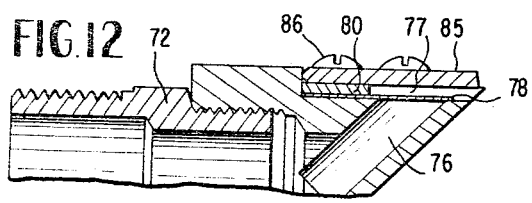
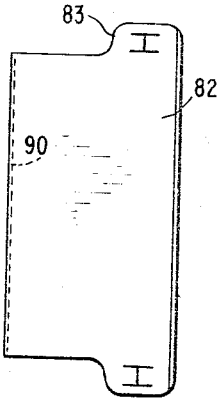
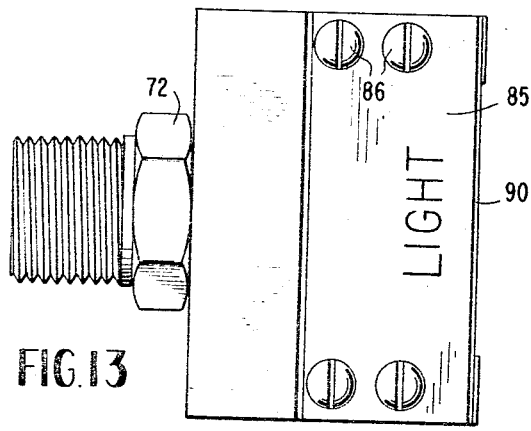

United States Patent Office 3,334,792
Patented Aug. 8, 1967

3,334,792
ADHESIVE APPLICATOR
Joseph De Vries, Elizabeth, N.J., and George Z. Piencinski, Greenwood Lake, N.Y., assignors to Herculite Protective Fabrics Corporation, a corporation of New York
Filed May 19, 1966, Ser. No. 551,413
9 Claims. (Cl. 222—289)

The present invention is directed to an adhesive applicator, more particularly to an applicator which is capable of spreading a layer of adhesive having a desired thickness and width upon a surface and capable of a positive valve action whereby the flow of adhesive will start and stop in a clean, even manner.

There is commercially available a variety of nozzles, tips and orifices which are used to spread or apply liquid and paste-like materials, such as adhesives and sealing compounds. In operation, the material to be spread is contained in a reservoir and dispensed by a mechanical plunger, worm screw or air pressure. The material flows from the supply source, through the tip or nozzle, to the area desired. Such conventional tips are satisfactory for many materials and applications. However, these prior existing devices of this nature are generally deficient because of their inability to immediately stop the flow of fluid, at the tip, when pressure is released and their inability to specifically and accurately control the film thickness being extruded through the applicator tool. Such a situation has necessitated the development of the present applicator.

The applicator described herein is a novel device for laying down continuous ribbons or layers, having controlled width and thickness, of high viscosity fluids or pastes on relatively smooth flat surfaces, such as fabrics, coated fabrics, wood, metal, fiberglass, plastic, glass, Masonite, plasterboard, concrete, asphalt and other like materials. The device of the present invention comprises an applicator head which is adapted to be connected to a source of adhesive which may be placed under pressure. The applicator is provided with a spring biased valve which is normally maintained in the closed position and upon the application of pressure to the adhesive the pressurized adhesive is capable of opening the valve to allow the passage of adhesive. Upon termination of the pressure on the adhesive the spring biased valve means is immediately closed to provide a quick, clean shut-off of the flow of adhesive. The applicator is also provided with a spreader means by which the thickness of the adhesive layer being laid down will be accurately and adjustably controlled.

The present invention is, therefore, directed to a unique applicator capable of positive fluid shut-off at the point of fluid to surface application at the instant external pressure on the fluid is relieved. Such a feature permits clean, positive starting and stopping of the fluid flow as it is applied to a surface. The present applicator, due to the relative movement of the spring biased valve means, enables the fluid flow rate to be varied directly as induced variations in the external force applied on the fluid in the applicator.

Other objects of the invention will be pointed out in the following description and claims and illustrated in the accompanying drawings which disclose, by way of example, the principle of the invention and the best mode which has been contemplated of applying that principle.

In the drawings:

FIGURE 7 is a perspective view of a modification of the applicator;

FIGURE 8 is a top plan view of the applicator of FIGURE 7 with the spring and cover plate removed;

FIGURE 9 is a sectional view along the line 9—9 of FIGURE 7;

FIGURE 10A is a partial sectional view similar to FIGURE 9 with the applicator applying a thin layer of adhesive;

FIGURE 10B is a partial sectional view similar to FIGURE 10A with the applicator applying a thick layer of adhesive;

FIGURE 11 is a top plan view of the reverse side of the cover plate shown in FIGURE 7;

FIGURE 12 is a partial sectional view similar to FIGURE 9 illustrating a modification of the cover plate; and FIGURE 13 is a top plan view of the modified applicator shown in FIGURE 12.

The present application is directed to an applicator for applying adhesive to a surface comprising a body portion having a smooth face with one edge thereof defining a lip for the flow of adhesive and adapted to be disposed in flush relation to said surface, recess means in said body portion extending to and along said one edge of said face, conduit means located in said body in fluid communication with said recess means and adapted to be connected to a source of pressurized adhesize, valve means disposed in said recess to control the flow of adhesive through said recess and over said one edge of said face and spreader means secured to said body and substantially covering said recess means to regulate the thickness of adhesive on said surface as the adhesive flows out of said recess means.

Figure 1:
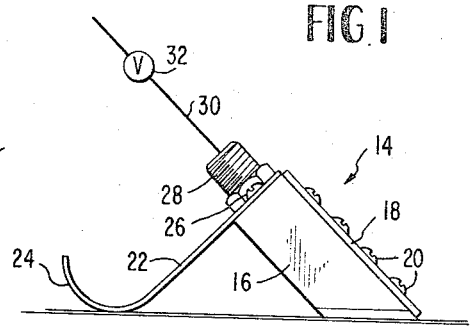
FIGURE 1 is a side elevation view of the applicator in adhesive applying position.

Referring to the drawings, the applicator in FIGURE 1 is designated generally by the numeral 14. The applicator is comprised of a body portion 16 having a cover plate 18 secured thereto by screws 20. The body portion 16 is maintained in a desired angular relationship with respect to the working surface by means of a support arm 22 which is basically a strip of spring metal having an upturned end 24 to enable the arm to slide smoothly over the working surface. The arm 22 is secured to the body portion by means of screws 26. An adapter 28 is connected to one end of the body portion 16. A conduit 30 and valve 32 have been shown schematically in relationship to the adapter 28 to control the flow of pressurized adhesive to the applicator. A reservoir of adhesive capable of being squeezed out or forced out by a plunger or the like may also be secured to the adapter.

Figure 2:
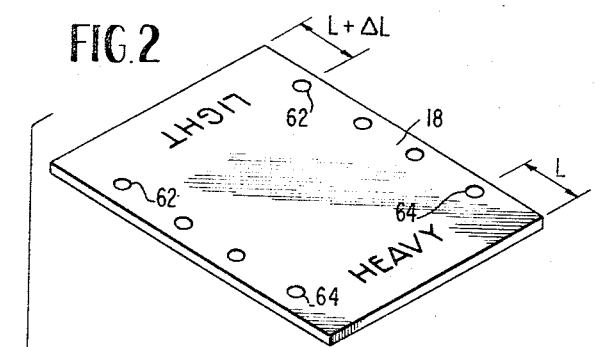
FIGURE 2 is an exploded perspective view of the applicator shown in FIGURE 1.

The body portion 16 is provided with a face 34 which is disposed at an angle of approximately 45 degrees with respect to the upper and lower surfaces of the body portion. The upper surface 36 of the body portion, shown in FIGURE 2, is provided with a recess 38 having a pair of notches 40 extending outwardly therefrom into the body portion. A bore or conduit 42 is formed in the end of the body portion 16 and is in fluid communication with the base of the recess 38. The forward edge of the bottom of the recess 38 is beveled at 37 and defines a lip over which the adhesive is adapted to flow during the application of the adhesive to a work surface. Along the edges of the body portion adjacent the sides of the recess 38 a plurality of screw holes 44 are drilled. The holes 44 along the sides of the body portion are equally spaced from each other for reasons which will appear hereinafter.

Figure 3:
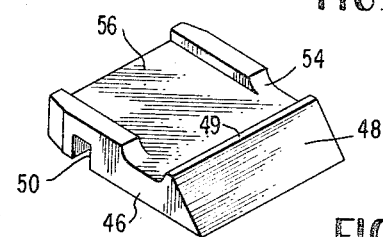
FIGURE 3 is a perspective view showing the reverse side of the valve plunger as viewed in FIGURE 2.
Figure 5:
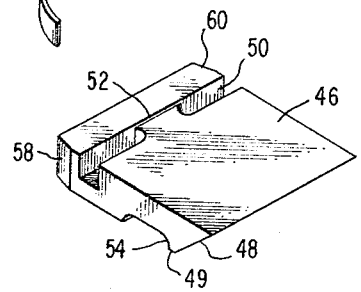
FIGURE 5 is a top plan view of the applicator along the lines 5—5 in FIGURE 4 with the cover plate removed.
Figure 5:
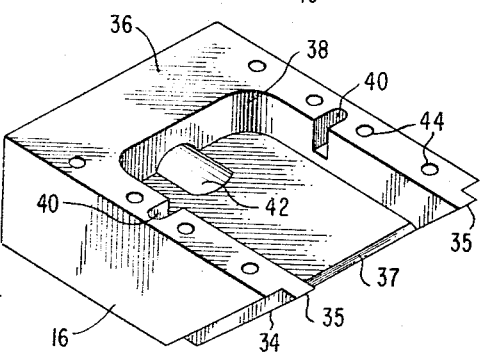
Figure 5:
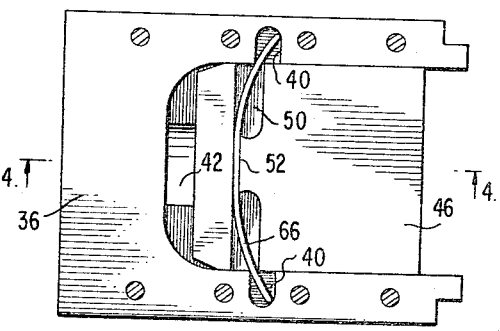
Figure 4:
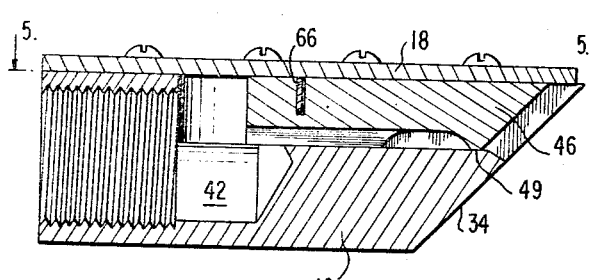
FIGURE 4 is a sectional view along the lines 4—4 of FIGURE 5 with the cover member added.

The valve member or plunger 46 is provided which is adapted to reciprocate within the recess 38 in the body portion 16. The thickness and width of the plunger 46 are substantially equal to the depth and width of the recess 38, respectively to provide a close fluid tight but slidable fit. The bottom of the plunger 46 as shown in FIGURE 3 is relieved at 54 and at 56 to provide a longitudinal groove and a transverse groove. The transverse groove 54 extends entirely across the width of the plunger whereas the longitudinal groove 56 is terminated at one end by a lip 49. The forward face 48 of the plunger 46 is beveled at a 45 degree angle with respect to the body of the plunger and as the plunger reciprocates back and forth within the recess 38 the face 48 will be maintained in parallel relationship to the face 34 on the main body 16. The opposite or upper face of the plunger is provided with a transverse groove at 50 having a narrow central portion 52 of a width substantially equal to the thickness of the leaf spring 66. The end edges of the plunger are beveled at 58 and 60 so that the plunger will not interfere with the curved inner edges of the recess 38 as the plunger shifts inwardly. The ends of the spring 66 are disposed in the notches 40 as shown in FIGURE 5. Thus the spring 66 provides a constant biasing force tending to move the plunger 46 inwardly in the recess 38.

The body portion 16 is provided with a cover plate or spreader plate 18 having a plurality of equally spaced screw holes drilled along the edges thereof and indicated at 62 and 64. As clearly shown in FIGURE 2, the pair of holes designated 64 are spaced from the end of the plate by a distance L and the pair of holes designated 62 are spaced from the opposite end of the plate by a distance $L+\Delta L$. The legend "heavy" is provided adjacent the holes 64 and the legend "light" is provided adjacent the holes 62. Since the holes along the edges of the plate 18 are equally spaced, the plate is reversible end for end on the body portion. However, the end of the plate 18 disposed adjacent the face 34 of the body 16 will be either closer or farther away from the surface to which the adhesive is being applied, depending upon the disposition of the plate on the body portion. If the edge of the plate 18 is close to the work surface, a very thin layer of adhesive will be laid down and if the opposite edge of the plate 18 is disposed adjacent the work surface, a relatively heavy layer of adhesive will be laid upon the work surface.

Figure 6:
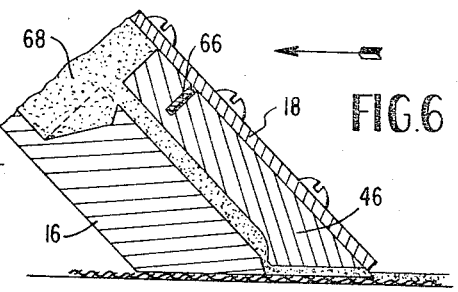
FIGURE 6 is a partial sectional view similar to FIGURE 4 with the applicator in adhesive applying position and with the valve open to permit the passage of adhesive.

In operation, the valve 32 would be opened to admit a supply of pressurized adhesive through the conduit 30 and the adapter 28 into the bore 42. The increase of pressure on adhesive in the bore 42 will force the plunger 46 to the right as shown in FIGURE 6 to provide a passage for the adhesive through the relieved grooves 56 and 54 in the bottom of the plunger and between the lip 49 and the beveled surface 37. As soon as the valve 32 is closed, the pressure of the adhesive on the plunger 46 will cease and the spring 66 will immediately bias the plunger inwardly bringing the lip 49 into sealing engagement with the bottom of the recess 38 to positively and cleanly shut off the flow of adhesive to the work surface.

FIGURE 7 shows a modification of the applicator which is comprised of a body portion 70 substantially triangular in cross section. The body portion 70 is provided with a relatively large flat base portion 71 which is adapted to rest upon the work surface to which the adhesive is to be applied. The adapter 72 is threaded into a bore in the body portion 70 and is adapted to be connected to a pressurized source of adhesive similar to the arrangement shown schematically in FIGURE 1. The body portion is provided with a main bore 74 and a small bore 76 which extends substantially parallel to the base portion 71. The upper surface of the body 70, as viewed in FIGURE 9, is provided with a recess 77 in which a relatively thin, flat spring valve plate 78 is disposed in covering relation with respect to the bore 76. A spacer bar 80 is superimposed upon the valve plate 78 inwardly of the recess adjacent the opening of the bore 76. A cover plate or spreader plate 82 is placed on top of the spacer bar 80 and is held thereagainst by means of a spring arm 84 secured in the groove 87 formed in the body 70. The cover plate 82 is provided with tabs 83 which extend outwardly of the spring plate 84 and are provided with the proper legends to designate the thickness of adhesive which will be applied with the spreader plate disposed in that particular position. One edge of the spreader plate is formed with a beveled edge 90 and the plate 82 may be reversed so that the bevel is either disposed, as shown in FIGURE 10A or as shown in FIGURE 10B. When the spreader plate 82 is disposed, as shown in FIGURE 7 and FIGURE 10A, a relatively light film of adhesive will be deposited on the layer of fabric 88 when the valve 78 is forced to the opened position by placing the adhesive 68 under pressure. The uppermost surface of the plate 82, when the beveled surface is disposed in FIGURE 10A, is marked with the letter L to indicate a light application of adhesive. In FIGURE 10B the plate 82 has been reversed and the adhesive is applied to the fabric 88 in a relatively thick layer when the flap valve 78 is forced open by the pressurized adhesive 68. FIGURE 11 shows a top plan view of the spreader plate 82 as it would be disposed in FIGURE 10B. In FIGURES 10A and 10B as soon as the pressure is removed from the adhesive 68 the inherent resiliency of the flap valve 78 will cause the valve to immediately close thereby positively and cleanly shutting off the flow of adhesive to the fabric.

FIGURE 12 shows a modification of the spreader plate which is indicated therein by the numeral 85. The plate 85 is secured to the body portion by means of screws 86 and may be reversed similar to the plate 82 described above. The edge of the plate 85 adjacent the outlet of the recess 77 is also formed with a beveled surface 96 which is similar to the beveled surface 90, described above, and will operate in the same manner. The plate 85 is also provided with the legends "light" and "heavy" on opposite sides thereof.

The spring valve plate 78 and the spacer bar 80 are provided with beveled corners 96 and 94, respectively, so as to eliminate interference with the rounded corners 92 of the recess 77.

Obviously, many modifications and variations of the present invention are possible in the light of the above teachings and it is, therefore, to be understood that within the scope of the appended claims the invention may be practiced otherwise than as specifically described.

What is claimed is:

1. An applicator for applying adhesive to a surface comprising a body portion having a smooth face with one edge thereof defining a lip for the flow of adhesive and adapted to be disposed in flush relation to said surface, recess means in said body portion extending to and along said one edge of said face, conduit means located in said body in fluid communication with said recess means and adapted to be connected to a source of pressurized adhesive, valve means disposed in said recess to control the flow of adhesive through said recess and over said one edge of said face and spreader means secured to said body and substantially covering said recess means to regulate the thickness of adhesive on said surface as the adhesive flows out of said recess means.

2. An applicator according to claim 1 wherein said valve means comprises a plunger slidably mounted in said recess means, spring means mounted between said body and said plunger to bias said plunger into said recess to prevent the flow of adhesive.

3. An applicator according to claim 2 wherein the surface of said plunger contiguous the bottom of said recess is relieved in part to define a sealing lip on said plunger surface adjacent said one edge of said face whereby when said plunger is forced outwardly against the bias of said spring means by pressure on the adhesive the adhesive will be permitted to pass through the relieved portion of said plunger and between said sealing lip on the plunger and said one edge of said face and when said plunger is biased inwardly by said spring means upon the cessation of pressure on the adhesive said sealing lip will move into sealing engagement with the bottom of said recess adjacent said one edge of said face to prevent the passage of adhesive through said recess.

4. An applicator according to claim 3 wherein said spring means is located on the surface of said plunger opposite said relieved surface whereby said spring means will not be contacted by the adhesive.

5. An applicator according to claim 1 wherein said spreader means is reversible to dispose a different edge adjacent the surface on which the adhesive is being applied to spread the adhesive with a different thickness.

6. An applicator according to claim 1 wherein said valve means comprises a thin spring metal plate disposed in the bottom of said recess means over the area where said conduit means is in fluid communication with said recess means, means securing the portion of said plate remote from said one edge of said face against the bottom of said recess to define a flap valve for controlling the flow of adhesive from said conduit into said recess.

7. An applicator according to claim 1 wherein said spreader means is comprised of a plate secured to said body by screw means.

8. An applicator according to claim 1 wherein said spreader means is comprised of a plate secured to said body by spring clip means.

9. An applicator according to claim 1 further comprising means for maintaining said smooth face of said body in flat face-to-face relation with said surface to which the adhesive is to be applied.

No references cited.

CHARLES A. WILLMUTH, *Primary Examiner.*

R. I. SMITH, *Assistant Examiner.*